United States Patent [19]

Morsbach et al.

[11] 3,910,403

[45] Oct. 7, 1975

[54] CONVEYER SYSTEM

[76] Inventors: Paul Morsbach, Martinsholzerstrasse 13, 8131 Aufkirchen; Hubert Strobl, Fasanenstrasse 82, 8025 Unterhaching, both of Germany

[22] Filed: Sept. 10, 1973

[21] Appl. No.: 396,099

[30] Foreign Application Priority Data

Sept. 14, 1972 Germany............................ 2244979

[52] U.S. Cl............................. 198/130; 198/177 R
[51] Int. Cl.²........................................ B65G 17/00
[58] Field of Search..... 198/130, 177 R; 104/173 R, 104/173 ST, 238, 239

[56] References Cited
UNITED STATES PATENTS

| | | | |
|---|---|---|---|
| 1,704,150 | 3/1920 | Riley............................ | 198/177 R |
| 1,922,141 | 8/1933 | Smith............................ | 198/130 |
| 2,146,689 | 2/1939 | Simon............................ | 198/130 |
| 2,156,353 | 5/1939 | Ranney............................ | 198/130 |
| 2,349,578 | 5/1944 | Ellen............................ | 198/177 R |
| 2,695,702 | 11/1954 | Ellen............................ | 198/177 R |
| 3,422,950 | 1/1969 | Bachmann............................ | 198/177 R |
| 3,563,203 | 2/1971 | Stiltner............................ | 198/177 R |
| 3,744,618 | 7/1973 | Monne et al............................ | 198/177 R |

*Primary Examiner*—Evon C. Blunk
*Assistant Examiner*—Joseph E. Valenza
*Attorney, Agent, or Firm*—Michael Klotz

[57] ABSTRACT

A conveyer system having a circulating continuous rope-type element for conveying loads and a plurality of discrete sleeve sections arranged on the rope-type element to form a flexible jacket thereon which is capable of carrying loads on and with the rope type element and serves as an intermediate and distancing means between the rope-type element and any rotating or stationary driving, guiding and tensioning means required to define the conveying path of the system and to carry loads therewith.

Guidance of rope-type conveyers is thus improved to make them applicable for industrial purposes such as assembly lines previously reserved for chain-type conveyers.

2 Claims, 10 Drawing Figures

CONVEYER SYSTEM

BACKGROUND OF THE INVENTION

The invention relates to conveyer systems having a circulating element such as a cable or rope for carrying and conveying loads.

Conveyer systems of this type are known, e.g. for ski-lifts or T-bar tow-lifts. In such prior art systems, the load or load carrier, e.g. a seat, to be conveyed is secured to the circulating rope or cable by means of clamps. These clamps are generally designed such that the cable or rope can pass all cable supports, i.e. wheels, pulleys or rollers which support the rope or cable from below or act from above, e.g. to deflect the rope or cable in an upward direction. In such prior art systems, the cable can be guided, in part, by horizontal wheels or rollers, i.e. those wheels or rollers having a vertical axis and deflecting the conveying path in a sideward or lateral direction. With such prior art horizontal wheels or rollers acting as side guides or lateral guides, the cable clamps extending from the cable must, however, be arranged at its outer side, i.e. away from the side guiding wheel. Arrangement of the cable clamps at the inner side of the cable, i.e. on the side of contact with the side guiding wheels, is not generally possible or requires major structural and operational complications. This fact has limited the application of single-cable conveyer systems, i.e. those having only one cable or rope both for supporting and conveying the load, and is the main cause why such conveyer systems are rarely used for industrial production or processing, e.g. for assembly lines or processing of articles in a sequence of stations even though the single-cable conveyer does offer important technical and commercial advantages, notably if compared with the conventional chain-type conveyers.

SUMMARY OF THE INVENTION

Therefore, it is a main object of the present invention to provide a cable or rope type conveyer system in which any conceivable change of direction of the rope or cable, i.e. the conveying path of the system, can be achieved in a simple manner.

It is another object of the invention to provide a cable or rope conveyer system in which the conveying or travel path can be directed and determined by simplified guiding and deflecting mechanisms.

Still another object of the invention is an improved cable-type conveying element for cable conveyers which element includes a continuous core and a flexible sleeve.

Yet a further object of the invention is an improved single-cable conveyer system suitable for industrial production and processing purposes.

Now, in order to implement these and still further objects of the invention which will become apparent as the description proceeds, we have found that any desired change of direction of a circulating conveying and carrying element such as a cable or rope (these terms being used interchangeably) or similar continuous structure having a generally round and preferably substantially circular cross-section can be achieved even though such element carries one or more outwardly extending load connecting means, provided that discrete sleeve elements or carrier bodies explained more in detail below are arranged to surround the circulating element and to serve both as load connecting means and as distancing elements between the rope and any support means used to define the conveying or travel path, to actuate the conveyer and to tension the circulating element.

According to a general and preferred embodiment, the conveyer system according to the invention comprises a. a circulating conveying and carrying element having a generally round cross-section, b. support means operatively associated with said circulating element to define a predetermined conveying path thereof, c. means for attaching loads to said circulating element, and d. a plurality of carrier bodies each having an opening to receive and surround said circulating element, at least one of said carrier bodies being provided with said means for attaching loads to said circulating element.

As mentioned above, the circulating element can be a rope or cable of any conventional type used for prior art conveyers, including those made of steel or natural or synthetic organic fibres and being composed of filaments, fibre threads, strands and the like. Multifilament or monofilament lines or flexible wires are suitable but less preferred.

The cross-section of the circulating element is generally round, such as that of a multi-strand cable. Preferably, the cross-section is substantially circular. The selection of suitable materials and dimensions for a given conveyer system having such a continuous element is well known in the art, keeping in mind that the carrier bodies explained in more detail below will not, in general, have an impact upon the required tensile strength of the continuous or core element.

Support means for being operatively associated with the circulating element are any means capable of supporting guiding, tensioning and driving the rope or cable of such a conveyer. Numerous forms of support means are known in the art, including wheels, rollers, pulleys, rolls etc., and can be used provided that the rope contacting the face portion of such support is capable of receiving the carrier bodies. In general, a single-rope conveyer system will include at least two such support means, one at each "end" of the closed loop formed by the endless element. Frequently, the support element at one end of the closed loop will be part of an end station generally including conventional means for driving, e.g. rotating the support element and thereby moving the endless element which is in frictional engagement with said wheel or other type of support. In general, the support element at the other end of the closed conveyer loop will be part of a tensioning structure so as to keep the endless loop under a predetermined tension and to compensate any slack resulting from operation under load and/or from permanent or temporary elongation of the rope. Between such end station supports, any desired number and type of intermediate support, rotatable or fixed and generally stationary, can be provided, depending upon the desired length and operative path of the conveyer. Again, any conventional supports for the cables or ropes of prior art cable conveyers can be used provided they are capable to operatively interact with the circulating endless core element plus the carrier bodies moving therewith. In addition, guide means from other technological fields not suited for conventional rope conveyers can be used for the system of the invention, e.g. roller pairs, notably those inclined towards each other at an angle of less than 180°, fixed, i.e. non-rotatable, supports such as slotted tubes and the like. Some preferred embodiments of such supports will be explained below in more detail.

The carrier bodies mentioned above are an important feature of the invention. In a preferred embodiment, such bodies are intended to form a flexible jacket or sleeve constituted of a plurality of discrete bodies of uniform shape surrounding the circulating or core element and moving therewith. Each body has an opening or bore extending through said body and shaped to receive and surround the circulating element or core. The cross-sectional shape of the opening will generally correspond with the cross-sectional shape of the core element or rope. Preferably, the bodies are generally cylindrical or tubular elements having an inner diameter of substantially the same size as the diameter of the rope or core. According to a preferred embodiment, the inner diameter of the bodies increases in at least one axial body direction, i.e. at least one end portion of the opening has a diverging taper. Preferably, the outer diameter of the bodies is at least twice the core or rope diameter and can be several times larger than the rope diameter. A range of from about 2 to 6 core diameters is generally preferred for the outer diameter of the bodies, 3 to 4 core diameters being an even more preferred range. The length of the bodies will depend upon the smallest turning point radius along the path. For example, the body length can be as small as the outer body diameter or smaller since the decreasing body length will increase flexibility. On the other hand, an increasing body length will decrease the flexibility of the jacket formed by the bodies but can be compensated by using a flexible material for the bodies. A length of from about 0.5 to about 3 times the outer diameter is given by way of example. It is to be noted that while the outer diameter of all carrier bodies in the given system according to the invention will be substantially equal, no such requirement exists for the length of the bodies. In fact, bodies of different length can be used in a given system. Some of carrier bodies, at least, will be supplied with load connecting means, such as fish eyes, shackles, bars or similar connectors serving to be connected with loads or with any sort of loading platform, intermediate connecting links or the like and generally extending from the carrier bodies for pending connection of load therewith. The connectors can be rigidly or otherwise attached to the bodies or form an integral part thereof.

Carrier bodies may consist, partly or entirely, of a light metal, e.g. aluminum and aluminum alloys, or of structural polymers, e.g. natural or synthetic macromolecular organic substances such as natural or synthetic rubber, polyurethane, polyamide or the like, including conventional additives, lubricants, etc. Cross-linked polymers, notably elastomers, are a preferred group of structural polymers.

Preferably, the carrier bodies are arranged on the rope or core element in an abutting relation. The abutting faces can be plane or curved. In a preferred embodiment, one abutting or end face of each body is shaped to constitute a concave and preferably spherically concave tail end while the opposite abutting face is shaped to constitute a convex and preferably spherically convex head end. It will be understood that if such bodies are arranged in a continuous abutting head-to-tail sequence, the continuity of the flexible jacket or sleeve surrounding the core will be better maintained upon travelling around a curve. In order to decrease friction between abutting body ends, either head or tail ends can be provided with a coating or layer having a low coefficient of friction with the material constituting the adjacent tail or head ends, respectively. For example, some or all tail ends would consist of a structural metal, e.g. a steel layer, while the bodies and some or all head ends would consist of a structural polymer, e.g. polyurethane.

As briefly mentioned above, the pending attachment of loads on the subject combination of rope and carrier bodies provides for lateral or other deflections of the circulating element with simple support means. For example, the combination of core-rope and carrier bodies can be supported from below by a pair of supporting wheels in a preferably inclined arrangement (i.e. the planes of the wheels intersect at an angle of up to 180° and generally not more than 90°) with a gap or distance between the wheels sufficient to permit passage of the pending load or load connector between the wheels. Instead of using such partitioned support wheels or wheel pairs for supporting the carrier bodies including effecting any desired change of the conveying path, slide supports in the form of slide shoes, pressure pads, and the like fixed slide means can serve as support means. With carrier bodies made of a material having a low coefficient of sliding friction on the material provided at the body contacting face or faces of the slide supports remarkable simplifications and savings of space required for the system can be achieved. An advantageous combination of materials for the carrier bodies, on the one hand, and body contacting faces of the slide guides, on the other hand, is for example polyamide, metal such as steel, aluminum or aluminum alloy. For example, the carrier body can be made of aluminum or an alloy thereof, while the slide support or its contact face is made of polyamide or, vice-versa, that the carrier body consists of polyamide or comprises a polyamide surface, while the slide supports consist of steel or another metal or comprise contact faces of steel or of such other metal.

For some types of conveyer systems, i.e. those with extended portions of the conveying path in a substantially horizontal arrangement so that the loads are carried over extended parts of the conveying path in a substantially horizontal movement, the slide supports can have a generally tubular structure or consist of a tube having an inner diameter which is somewhat larger than the outer diameter of the carrier bodies. Such a tube will be provided with a slot, preferably at its lower side, to permit passage of the load connecting means extending from some or all of said bodies, e.g. shackles, fish plates, or the like, used for pendingly attaching the loads to be conveyed by the system. Here, the support function for the load will be supplied by those parts of the tubular support means that are situated at the two tube portions adjacent to the slot.

BRIEF DESCRIPTION OF THE DRAWINGS

The invention will be better understood and objects other than those set forth above will become apparent when consideration is given to the following detailed description thereof. Such description makes reference to the annexed drawings showing preferred embodiments of the inventive system and its components. In the drawings

DETAILED DESCRIPTION OF THE DRAWINGS

Figure 1:
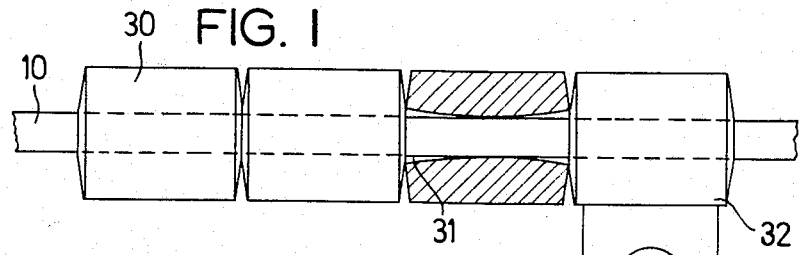
FIG. 1 is a fragmentary side view of a cable portion provided with carrier bodies according to a first embodiment of the invention, one of such bodies being shown in section.
Figure 2:
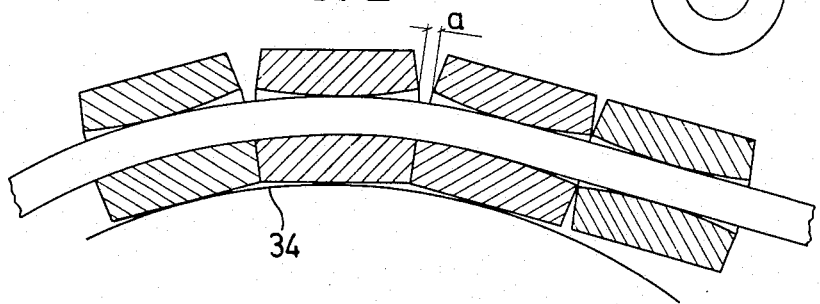
FIG. 2 is a fragmentary, sectional and semidiagrammatic view of the cable and carrier body combination of FIG. 1 while laterally deflected by a support means in the form of a horizontal deflecting wheel having a vertical axis of rotation, only a portion of said wheel being shown in FIG. 2.

With reference to FIGS. 1 and 2 of the drawings, cable 10 is surrounded by cylindrical bodies 30 having a diameter which, for example, is three to four times greater than the diameter of cable 10. For passage of the cable through carrier body 30 each carrier body comprises a centrical opening or bore 31 extending through the body and diverging at both ends in the manner of a cone or funnel. The cylindrical carrier bodies consist, for example, of aluminum or any other structural material used for linings of the rollers or wheels in prior art cable conveyers, i.e. hard rubber or a structural plastic such as nylon or polyurethane. Some or all bodies 32 are provided with load attaching means, e.g. in the form of an eye 33, hook, shackle or the like.

In FIG. 2, the rope or cable arrangement of FIG. 1 is shown while passing a horizontal wheel or roller 34. Viewed in cross-section, bore 31 is shaped so that the rope or cable 10 is guided along a circle having a radius determined by the radius of wheel 34 and the wall thickness of carrier body 30. Cable 10 in bore 31 of bodies 30, accordingly, provides a line of contact having a constant curvature or bend upon the path around the wheels.

Pulleys, rollers and wheels of prior art cable conveyers normally are provided with a lining, e.g. of rubber or aluminum. For pulleys, rollers or wheels of a conveyer system according to the invention this is not required because the carrier bodies 30 will, in general, consist of a material which serves the same function of prior art linings, i.e. reducing attrition, abrasion and other types of mechanical attacks acting on the cable. Accordingly, cable wheel 34 can be made of structural metal, e.g. steel, without including any sort of lining.

As will be seen from FIG. 2, the mutual distance between the bodies upon passing wheel 34 will increase by a distance which is somewhat smaller than half of the distance $a$ shown in FIG. 2. As the carrier bodies are intended to abut, i.e. contact each other, as closely as possible, an intermediate annular structure (not shown) made of an elastic material, e.g. soft rubber, can be interposed between each pair of adjacent bodies to compensate for shift $a$.

Figure 3:
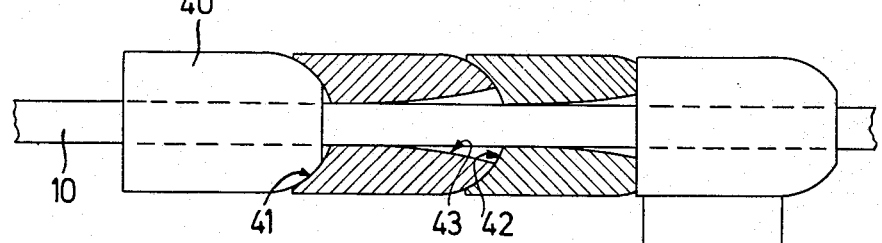
FIG. 3 is a fragmentary side view of a cable portion provided with carrier bodies according to another embodiment, some of the bodies being shown in section.
Figure 4:
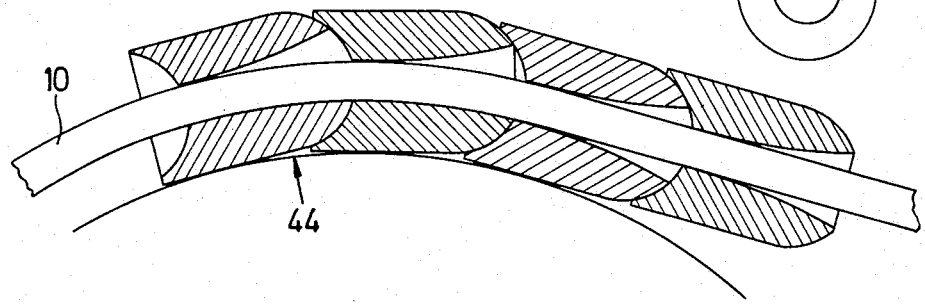
FIG. 4 is a fragmentary, sectional and semi-diagrammatic view of the cable and carrier body combination of FIG. 3, while laterally deflected by a support means in the form of a horizontal wheel, only a portion of which is shown.

The embodiment shown in FIGS. 3 and 4 comprises arrangements similar to those illustrated in FIGS. 1 and 2. However, the carrier bodies 40 are provided with spherically shaped head end faces 41 extending into spherically shaped recesses or seats 42 at the tail ends of adjacent carrier body 40. Faces or head ends 41 and seats or tail ends 42 are capable of relative displacement of the contacting faces while being deflected by wheel 44 without changing the distance between such two carrier bodies during the path of deflection. In a manner similar as shown in FIGS. 2 and 3, the opening or bore 43 of bodies 40 is shaped such that cable 10 is guided on a circular path and, while travelling around a wheel or curved face, will contact the inner faces of the carrier bodies along a line of contact. Bore or opening 43 is of such a shape that it surrounds the rope at seat 41 and conically widens or divergently tapers in the direction to the convex spherical face so that the plane of contact of the cable, viewed in section, forms a circle.

Upon passing a wheel or other curved support means, the spherical seats or tail ends and the convex spherical faces or head ends are mutually displaced. In order to avoid energy losses due to friction, a low-friction combination of materials is preferred for the contacting end faces. For example, when body 40 consists of polyurethane, a seat or tail end having a steel cover or plate is preferred. Such seats or tail ends forming components made of steel can be integrally combined with body 40, e.g. by casting or molding techniques known per se.

Loads may be attached to one or more of the bodies disclosed. The supporting means, however, must permit passage of the load. In the diagrammatic illustration of FIG. 5 support wheels 51 and 52 laterally contact body 40 in such manner that load connector 55 can pass between the wheels. In an axial view, wheels or rollers 51 and 52 are shaped such that the roller faces 54 form a circularly shaped contact face, the radius of which is substantially equal to the radius of cylindrical bodies 40.

Figure 6:
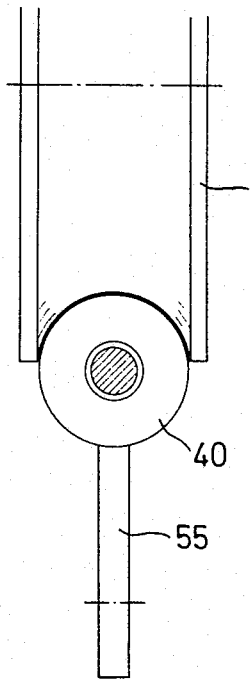
FIG. 6 is a semi-diagrammatic, fragmentary and partly sectioned front view of the type shown in FIG. 5, however, with a support means in the form of a depressor wheel or roller having a substantially vertical axis of rotation and contacting the combination of cable and carrier body from the top side, thus deflecting the conveying path in an upward or downward direction, only a part of the depressor wheel being shown.
Figure 7:
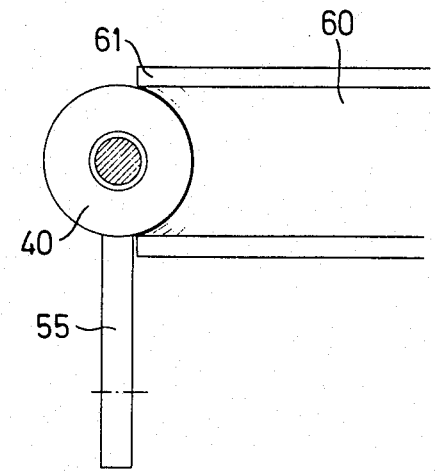
FIG. 7 is a semi-diagrammatic front view similar to that shown in FIG. 6, however, with a support means in the form of a substantially horizontal wheel or roller having a vertical axis of rotation and deflecting the conveying path in a lateral direction.

As shown in FIG. 6, even such bodies 40 as are provided with load attaching means such as hooks 55 can pass below a depressor roller 58, i.e. a roller or wheel deflecting the rope in a vertical or upward direction without any difficulties. In a similar manner, passage of the inventive cable and carrier body combination in contact with a horizontal wheel, disc or roller 60 is illustrated in FIG. 7. Roller rim 51 is shaped such that contact thereof with load hooks 85 is prevented. FIG. 7 can also be viewed as a mirror image, i.e. the lateral deflection of a conveyer system according to the invention is possible both at the left and at the right side, as contrasted with prior art systems with fixed clamps permitting onesided lateral deflection only.

Figure 5:
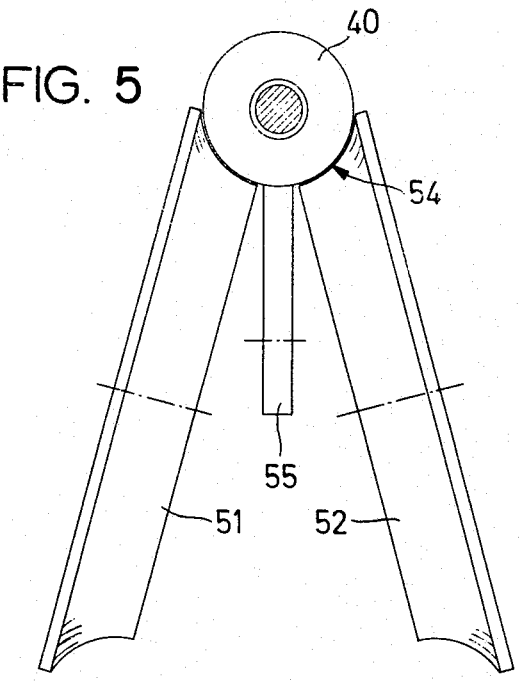
FIG. 5 is a semi-diagrammatic, perspective front view, partially sectioned, of a cable provided with carrier bodies, while supported by a wheel combination, including a mutually inclined pair of wheels or rollers.
Figure 8:
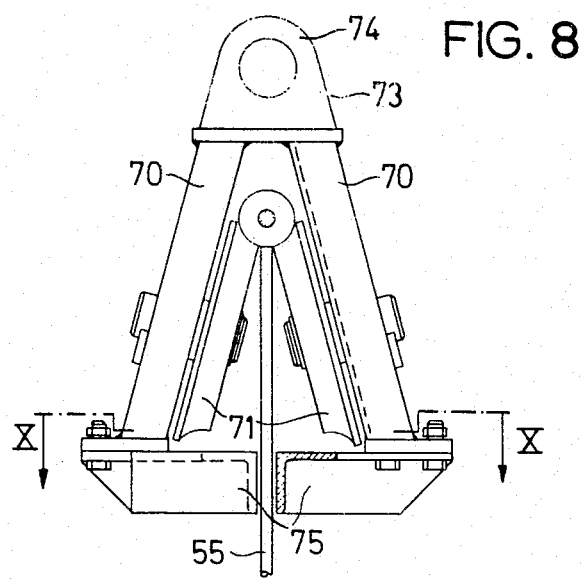
FIG. 8 is a partially sectioned front view of a support means including a wheel combination of the type shown in FIG. 5 in a structural arrangement showing passage and lateral guidance of load attaching means in pending arrangement.
Figure 9:
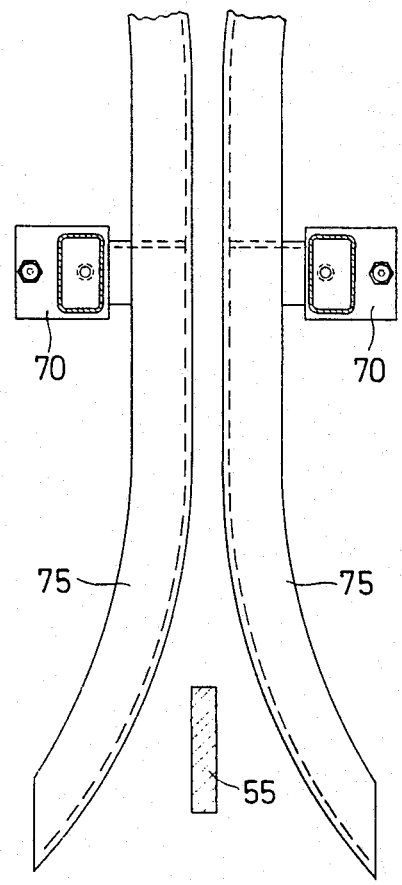
FIG. 9 is a sectional view of the support means of FIG. 8 along sectioning line X—X.

In FIG. 8, the support roller combination illustrated in FIG. 5 is shown in a more detailed and preferred embodiment. Rollers 71 are rotatably secured on two beams 70. The rollers can be of the same configuration shown for rollers 51 and 52 in FIG. 5. Beams 70 are interconnected by means of yoke 73 which is provided with an eye 74 for movably suspending the entire roller combination. Accordingly, the rollers are capable of adjustment in accordance with the path of the cable. Fenders 75 are provided at the lower ends of beams 70 to guide load hooks 55. Preferably, the distance between such fenders increases towards both of their ends as shown in FIG. 9. Such arrangement provides for optimal guidance of load hooks or other load attaching means along their path between fenders 75 or other lateral guiding elements such as rails.

Figure 10:
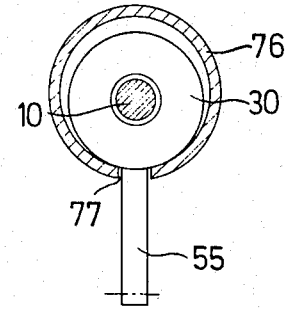
FIG. 10 is a diagrammatic, partially sectioned front view of a further embodiment of the support means while supporting the combination of cable and carrier bodies.

FIG. 10 shows an embodiment where carrier body 30 is not supported and guided by rotating means such as rollers, but fixed, i.e. non-rotating means, such as slide guides or shoes 76. Slide shoes 76 essentially consist of a suitable length of tube provided with a slot 77 at the lower side. The inner diameter of slide shoe 76 is somewhat larger than the outer diameter of carrier body 30. Slot 77 serves for passage of the load attaching means such as load hook 55. Selection of a suitable combination of the materials for mutual contact is essential in this embodiment if friction is to be reduced between slide supports and the carrier bodies. For example, it is preferred in this embodiment that the carrier bodies are made of a structural metal, e.g. aluminum or aluminum alloy, while the slide shoes or their contacting faces at least are made of a structural polymer, e.g. polyamide, or vice-versa.

If the slide shoe is to be made of a structural metal of the steel group, the carrier body can be made of a structural polymer having a low friction on steel, e.g. polyamide.

For assembly of the inventive combination of rope and carrier bodies, such bodies can generally be applied to the cable both prior and after assembly of the installation including splicing the cable. For mounting prior to splicing and assembly, the bodies simply can be slipped onto the cable. However, carrier bodies can be secured on the cable after splicing thereof, e.g. by using carrier bodies made of segments to be combined by means of bolts, adhesives or the like to form integral carrier bodies. Carrier bodies of normal or reduced length can be made of a flexible material and having a slot so that the body may be placed around the cable with or without subsequent closure of the slot. Use of such slotted bodies is of advantage, for example, to compensate an elongation of the cable.

As is common in the art, the end portions of a rope or cable are spliced to form closed conveyer loops. The spliced portion of the cable may have a somewhat larger diameter than the unspliced cable. Such spliced portions can be used for the invention as a cam means for engagement with one or more carrier bodies. Such cam effect can be reinforced, if desired, by using cables having several portions of increased diameter. Also, it can be of advantage to use other securing means between the cable and some or all carrier bodies. For example, a sequence of carrier bodies can be interspersed with securing bodies clamped onto the ropes, e.g. by using segmented bodies and combining the segments to clampingly engage the cable. Preferably, any such securing body will have the same outer diameter as the carrier bodies so as not to interfere with the sleeving function of the bodies.

Rope or cable conveyer systems according to the invention can be used wherever prior art robe conveyers have been used, i.e. for conveying loads, including persons. Inventive conveyer systems can be used, however, for conveying purposes which heretofore have been reserved for more expensive types of systems such as chain conveyers, e.g. for assembly lines, multistation processing and similar industrial purposes where loads or products are to be carried through a sequence of manufacturing or processing stages such as conveying automobile parts through coating stations and the like, or conveying articles such as apparels through manufacturing or other treating stages including drycleaning or the like.

Accordingly, the invention provides for a field of applications for cable conveyer systems and particularly their use for applications which onto now have been the domain of chain conveyer systems for pendingly arranging the loads. It is apparent that an inventive conveyer system with a single cable or rope as load-conveying and load-carrying element is of simpler construction, requires less maintenance and is less costly than prior art chain conveyer systems and yet provides for any practical arrangement of a desired conveying or operating path.

What is claimed is:

1. A conveyor system comprising
   a. a circulating conveying and carrying element having a generally round cross-section,
   b. support means operatively associated with said circulating element to define a predetermined conveying path thereof;
   c. means for attaching loads to said circulating element; and
   d. a plurality of carrier bodies each having an opening to receive and surround said circulating element, at least one of said carrier bodies being provided with said means for attaching loads to said circulating element, said carrier bodies having a generally cylindrical shape and being arranged to substantially cover said circulating conveying element so as to form a substantially continuous flexible sleeve composed of a substantially continuous sequence of said carrier bodies, at least some of said bodies each having a convex head end portion and a concave tail end portion, each of said end portions having a substantially spherical shape, said bodies being arranged on said circulating element in a substantially continuous head-to-tail sequence.

2. The system claimed in claim 1, wherein one end portion of said carrier bodies is provided with a metal face.

* * * * *